Nov. 24, 1964   J. H. BREMS   3,158,121
MECHANICAL MEMORY DEVICE
Filed March 3, 1960   6 Sheets-Sheet 1
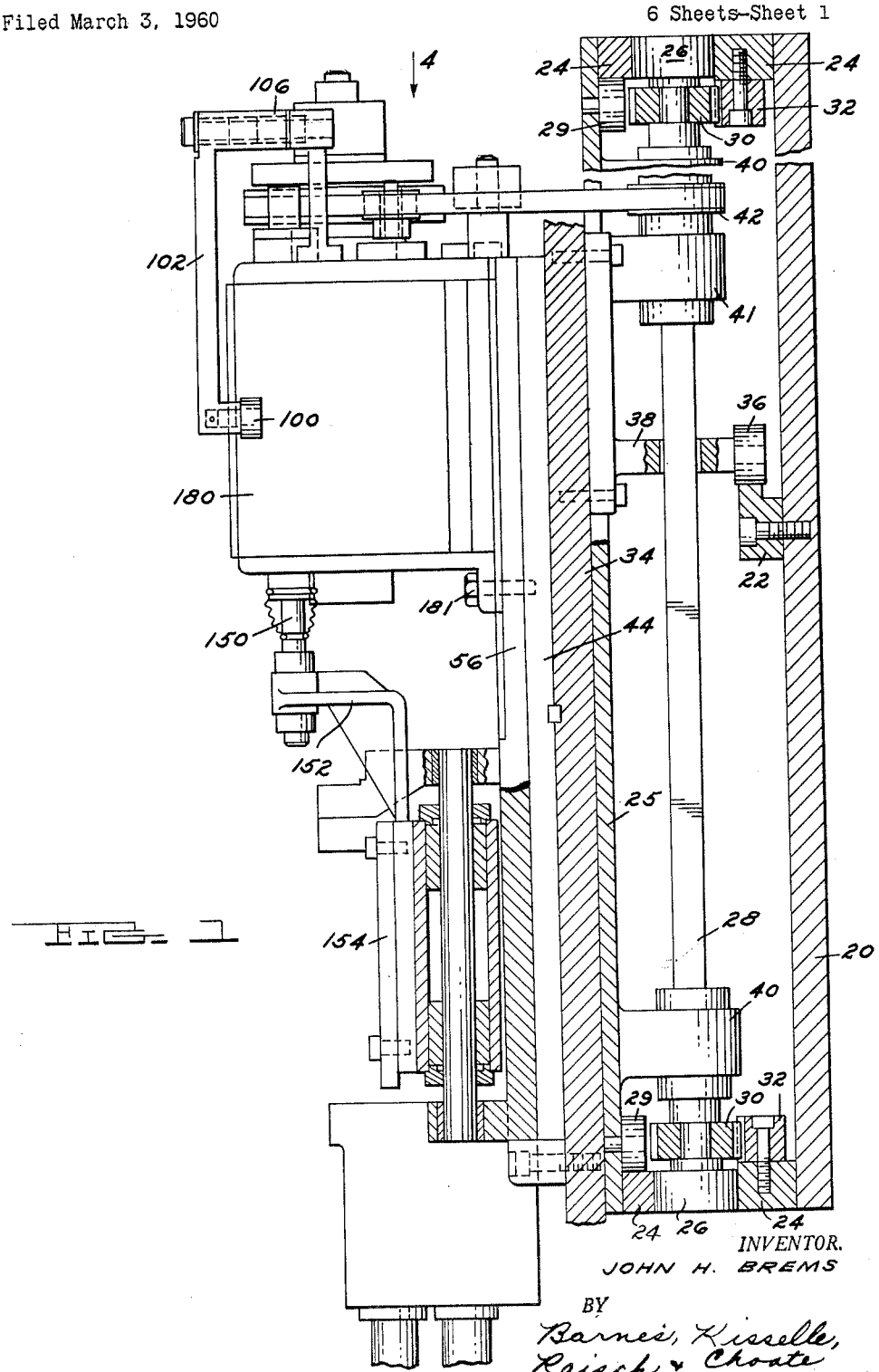
INVENTOR.
JOHN H. BREMS
BY
Barnes, Kisselle,
Raisch & Choate
ATTORNEYS

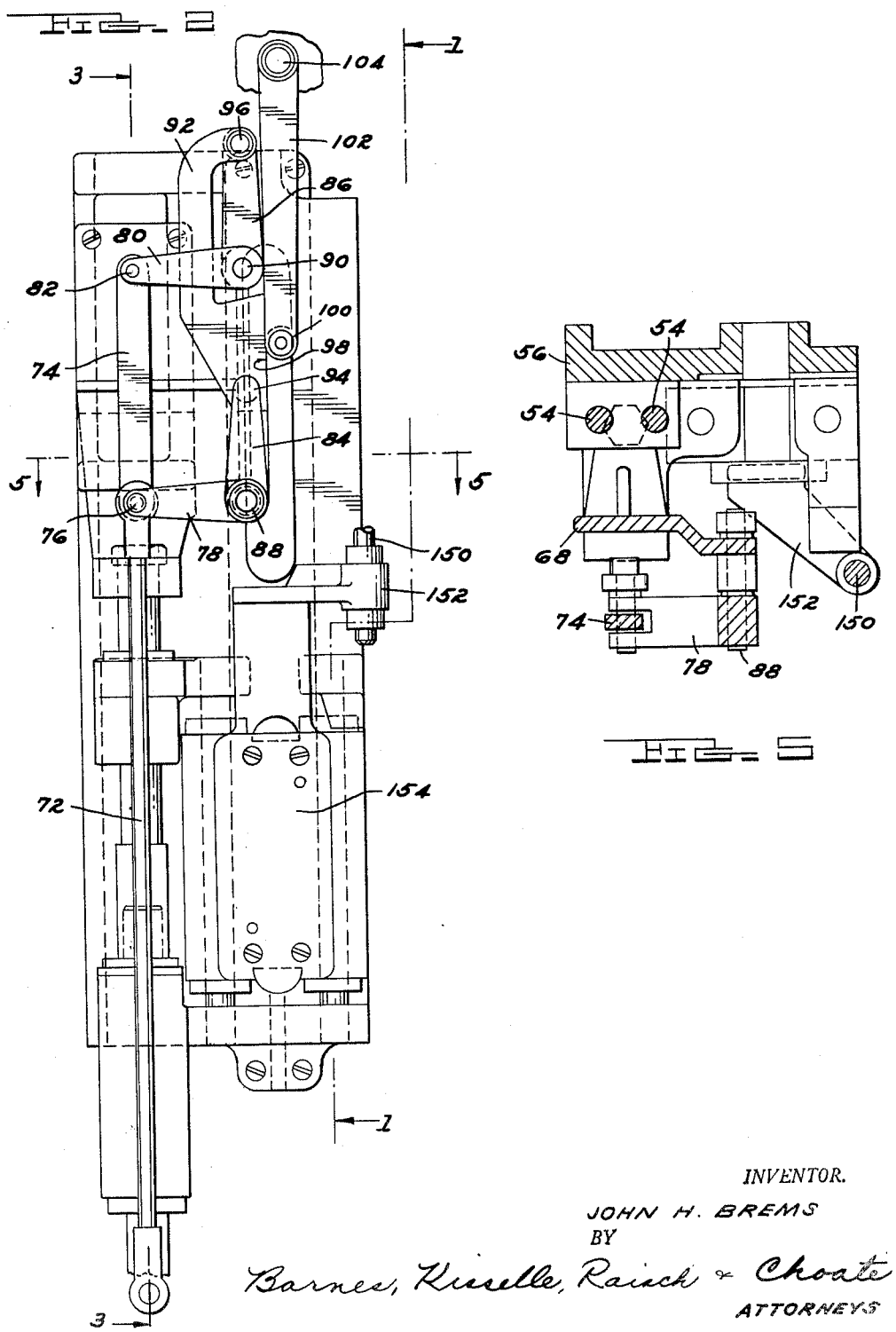

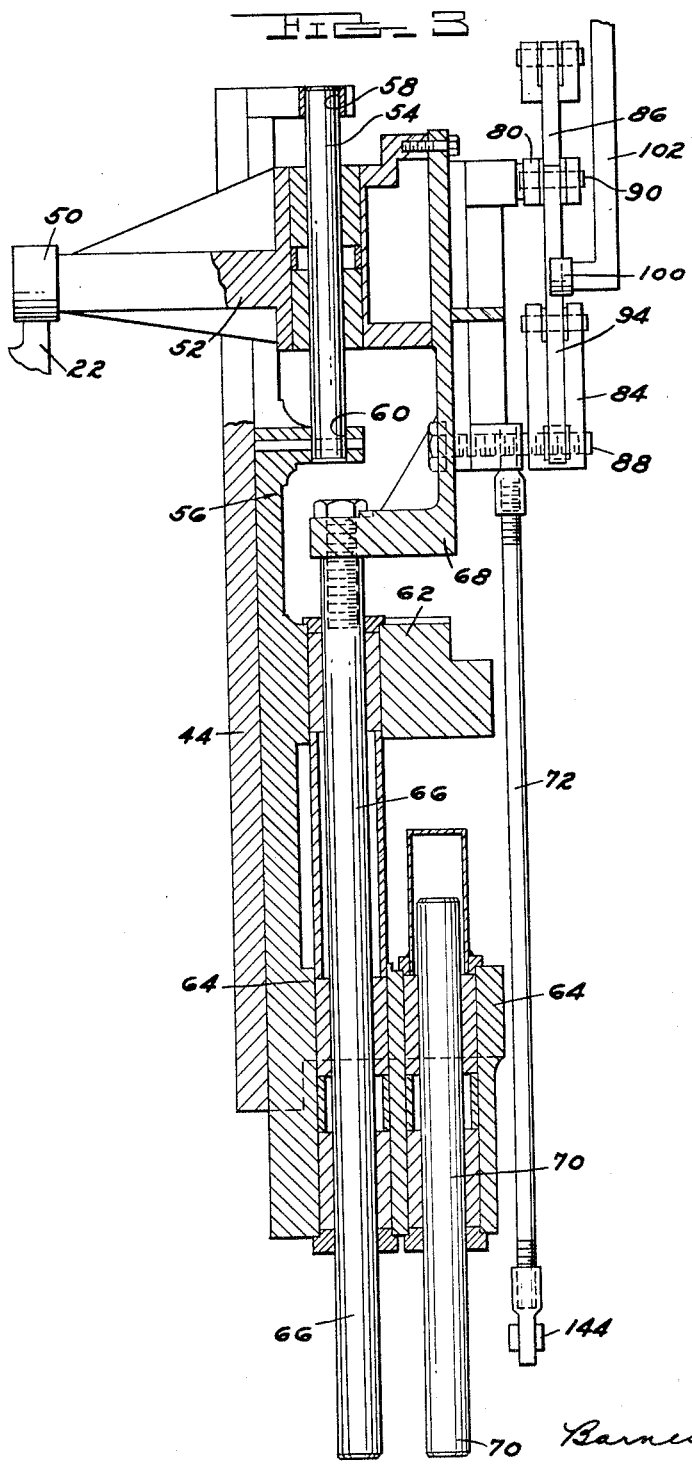

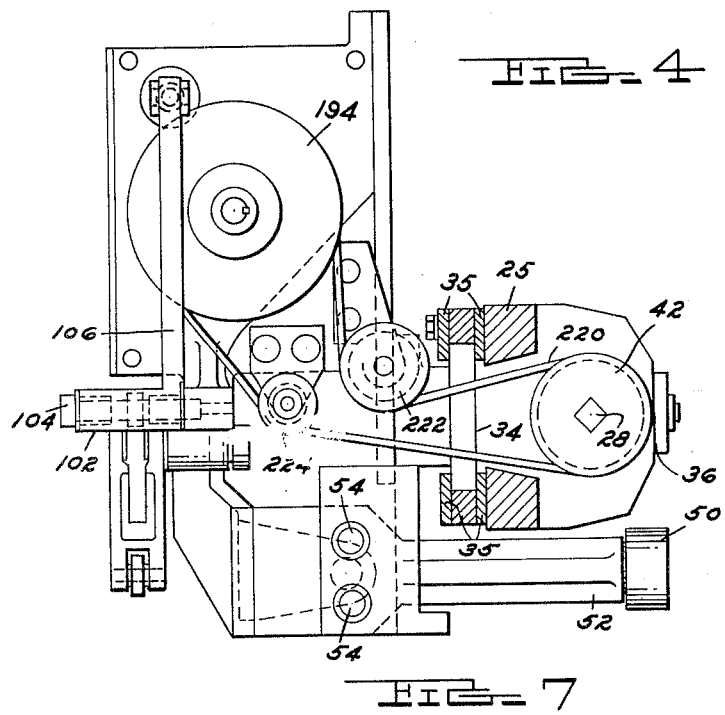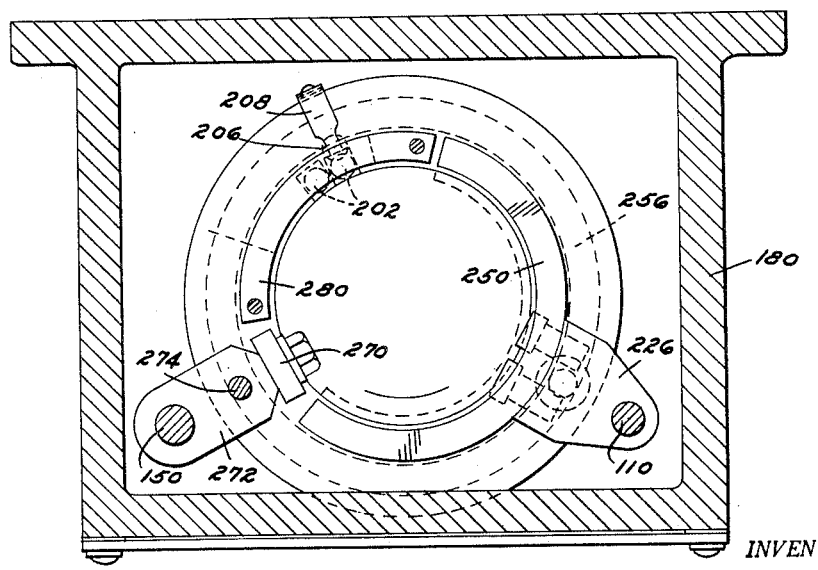

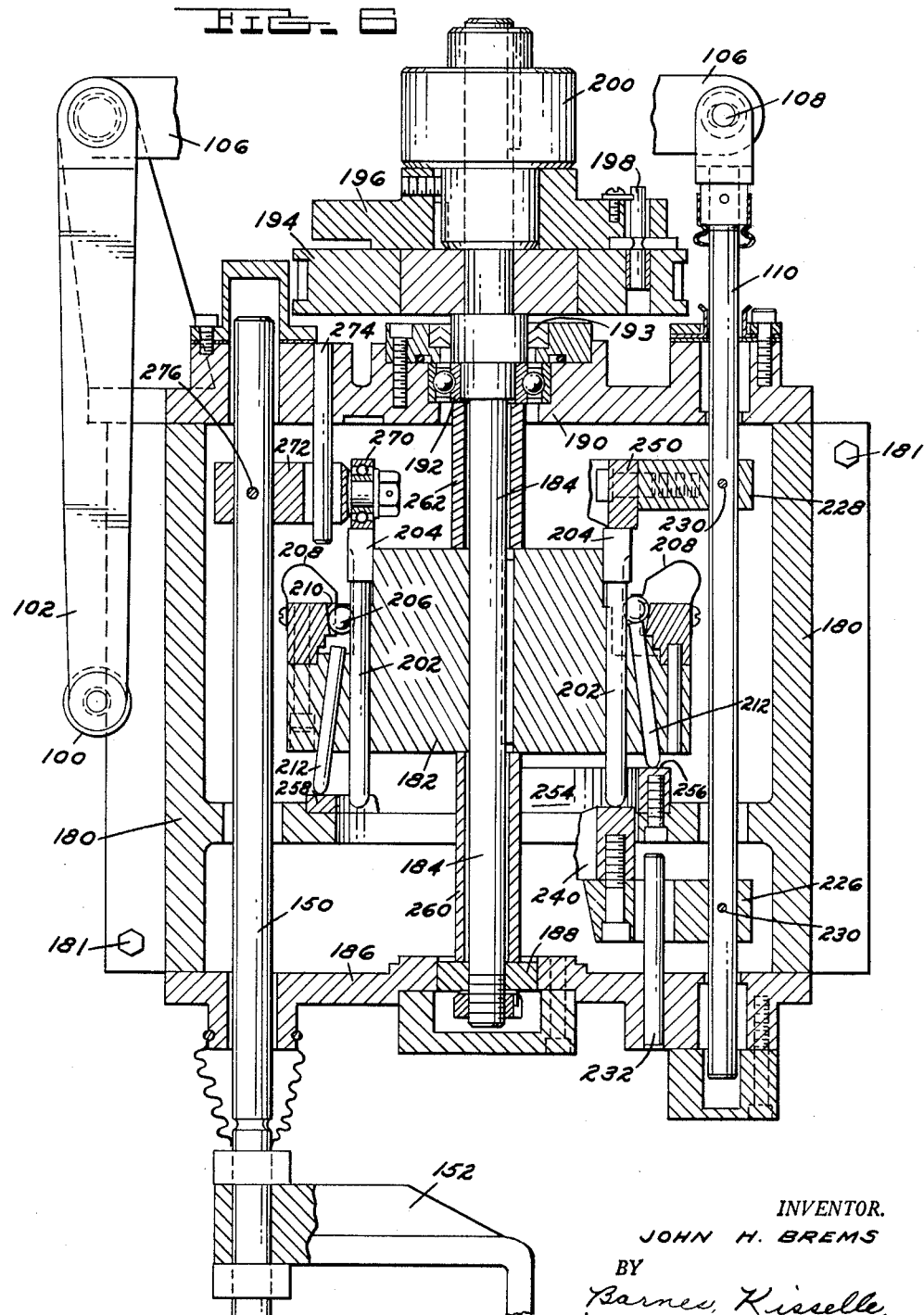

Nov. 24, 1964 J. H. BREMS 3,158,121
MECHANICAL MEMORY DEVICE
Filed March 3, 1960 6 Sheets-Sheet 6
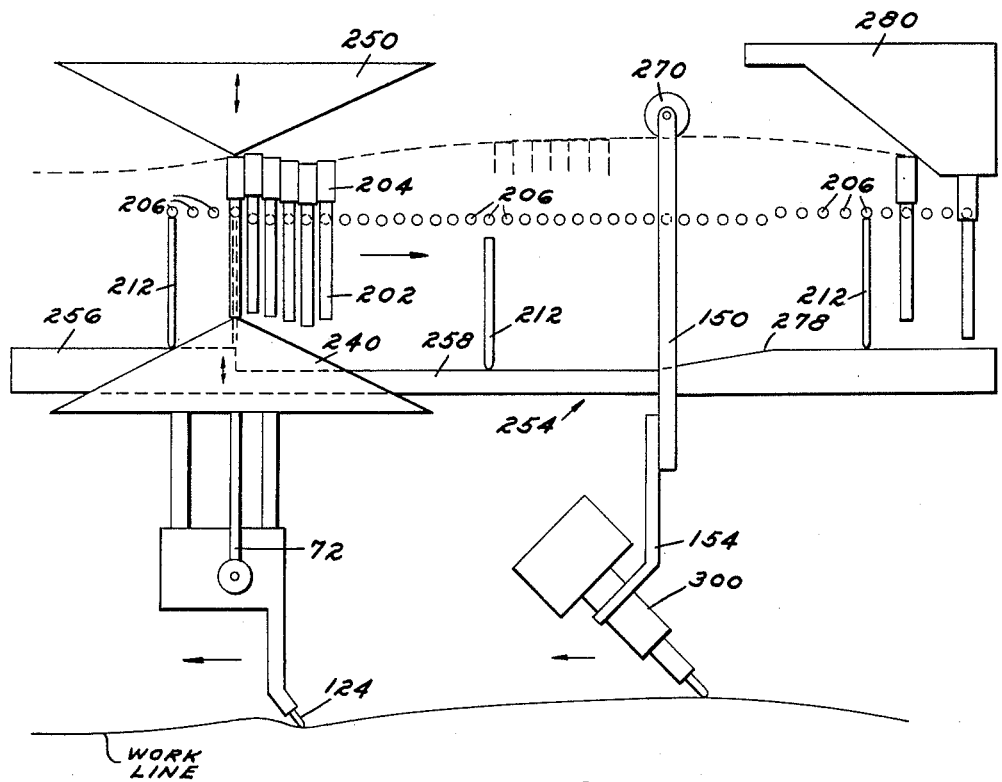
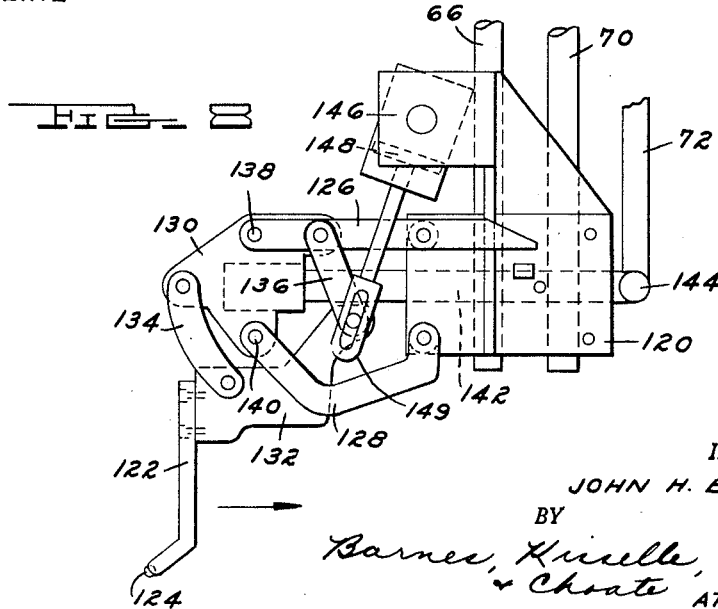
INVENTOR.
JOHN H. BREMS
BY
Barnes, Kisselle, Laisch
& Choate ATTORNEYS

United States Patent Office 3,158,121
Patented Nov. 24, 1964

3,158,121
MECHANICAL MEMORY DEVICE
John H. Brems, Southfield, Mich., assignor to Motomation, Inc., Detroit, Mich., a corporation of Michigan
Filed Mar. 3, 1960, Ser. No. 12,522
13 Claims. (Cl. 113—134)

This patent disclosure is directed to a welding machine.

It relates particularly to a machine for controlling a work head to follow a meandering course with sufficient accuracy to insure a good weld between adjoining parts.

Many manufacturing operations, including a welding operation, involve following a curved line with a reasonable degree of accuracy. In addition the line, as planned for production, may vary from the plan due to manufacturing tolerances especially in large stampings. This is especially true where forming operations are involved such as bending of heavy pieces. For example, an automobile frame piece has irregular curvatures which are accurately planned but the edge of a completed frame may vary materially from this plan because of inaccurate cutting of the original stock and discrepancies which develop in the forming operations.

The present disclosure is directed to a tracing head mechanism which will follow a defined contour as planned and which will compensate for any errors which have developed in the manufacture of the particular part. While the device may be adapted to other manufacturing operations than welding, it is described herein particularly in connection with a welding head which is movable in a path along a part.

An object of the invention is the provision of a device to accomplish the purpose outlined in the most economical manner.

It is an object of the device to provide a mechanism for recording intelligence in response to a physical contour and utilizing that intelligence after a predetermined delay which can be controlled to actuate a tool in the defined contour.

In my co-pending application, Serial Number 767,577, filed October 16, 1964, I have disclosed an electrical device for accomplishing the results sought; and in the present invention, I am disclosing a mechanical device for recording the vertical and lateral variations and utilizing a mechanical reading device for reflecting the variations at the work head.

It is an object to provide a device which is not subject to the electrical failures that might occur in the device utilizing magnetic tape for a recording and a device which is more easily serviced by mechanics without the necessity of an electronics serviceman.

A further object is the provision of a probe which not only reflects vertical variations, but reflects to a certain degree lateral variations which may require a change of position of the welding torch.

Other objects and features of the invention relating to details of construction and operation will be apparent in the following description and claims.

Drawings accompany the disclosure and the various views thereof may be briefly described as:

FIGURE 1, a side view partially in section of the torch-carrying slide and memory device taken on line 1—1 of FIGURE 2.

FIGURE 2, a front elevation of the assembly.

FIGURE 3, a sectional view of the probe mechanism taken on line 3—3 of FIGURE 2.

FIGURE 4, a top view of the assembly taken at line 4 of FIGURE 1.

FIGURE 5, a sectional view on line 5—5 of FIGURE 2.

FIGURE 6, a vertical sectional view of the mechanical memory housing.

FIGURE 7, a plan view of the cam mechanisms and follower devices.

FIGURE 8, an elevation of the probe mechanism.

FIGURE 9, a diagrammatic showing of the mechanism showing the various parts schematically.

Referring to the drawings: In FIGURE 1 the supporting frame for the master cam and the entire work head is designated at 20. The master cam 22, shown in section in FIGURE 1, extends horizontally in front of the frame 20. The frame has an upper and lower double track 24 to carry slide frame 25 mounted by follower rollers 26 on each end of a shaft 28, and by rollers 29. Each end of the shaft has a similar follower 26 operating in a similar double track 24 at the bottom and top of frame 20.

The horizontal rollers 29 are provided to share the vertical load of the device. On each end of the shaft 28 is a gear 30 which cooperates with a horizontal rack 32, shown in section in FIGURE 1. The work slide is mounted on plate 34 slidable in gibs 35 (FIGURE 4) on frame 25, and the entire load of the work slide plate 34 is carried by roller 36 mounted on arm 38 bolted to the plate 34 and extending through plate 25. Bushings, 40, mounted on frame 25, surround and support the square shaft 28 for rotation; slidable up and down with plate 34 is a bushing 41 on which is a pulley 42 which serves as a drive for the memory mechanism, the drive being synchronized with the motion of the head along the machine because of the fact that the gears 30 mesh with the racks 32 to create the motion. Shaft 28 passes directly through the arm 38.

On the slide plate 34 is a secondary plate 44. Supported on the plate 44 are three different mechanisms; first, a probe mechanism; secondly, a work tool mechanism, such as an electric or gas welding torch holder; and, thirdly, an interconnecting mechanism referred to as a memory device. The entire slide frame 25 slides on supporting frame 20 and, while it may be moved by hand to traverse the work piece, it is preferable to have a power motion accomplished by electric or hydraulic motive power by a conventional drive (not shown).

Referring first to the Probe Mechanism, attention is first directed to FIGURES 2, 3 and 8. In FIGURE 3 a cam roller 50 moves on the horizontal master cam 22 previously referred to. This roller and cam follower 50 is mounted on a bracket 52, the bracket being slidable on a vertical rod 54 suitably mounted in a cast plate 56 having recesses 58 and 60 for mounting the rod 54. Plate 56 also has projections 62 and 64 which slidably mount a slide rod 66 fastened to a plate 68 mounted to the bracket 52. Also mounted in the extension 64 on plate 56 is a secondary parallel slide rod 70, these rods being suitably mounted for sliding motion in proper bushings and bearings.

Depending along side of the rod 66 and 70 as shown in FIGURE 3 is a tie rod 72 which might be termed a probe response rod. The probe response rod 72 is connected to a parallelogram system of levers as shown in FIGURE 2, there being a vertical link 74 pivoted to the rod at joint 76 and horizontal links 78 and 80 pivoted respectively at joint 76 and joint 82. Each link 78 and 80 is connected to a vertical link 86 and 84 pivoted respectively at 90 and 88. These vertical links are connected respectively to the opposite ends of a motion transfer plate 92 which has a surface 98 in contact with a roller 100 on the end of a lever arm 102 pivoted at 104.

It will be seen that vertical motion on tie rod 72 will be translated into horizontal motion of the roller 100 which will result in the turning of an arm 106 also on pivot 104. The arm 106 is connected at pivot 108 to a vertical rod 110 extending down into the memory device.

It will thus be seen that vertical motion on the probe connecting rod 72 translates into horizontal motion at the roller 100 and is translated back into vertical motion at the rod 110, the function of which will be later described.

The actual probe device which is associated with the arm 72 is illustrated in FIGURE 8. A block or mounting plate 120 is clamped to the two parallel shafts 66 and 70. Supported on this block 120 is a probe element 122 having an actual contact ball 124 which moves along the weld line of the work. Both vertical and lateral motion of the ball 124 is translated to the rod 72 through the linkage which is comprised of two substantially horizontal links 126 and 128, a secondary linkage plate 130, a primary linkage plate 132 and connecting links 134 and 136. The particular mechanism in the illustrated instance is set up for a 19° torch angle so that motion of the ball 124, on a line extending 19° to the horizontal to the right and upwardly, will cause no perceptible motion of the torch. Any horizontal or vertical motion, however, away from the 19° line, will cause a response in the lever 72. The operation is as follows:

Primary plate 130 is pivoted at 138 on the end of link 126 and pivoted at 140 on the link 128. Direct upward motion of ball 124 would cause upward motion of these two pivots 138 and 140.

On the other hand, a lateral movement of the ball 124 to the right as viewed in the figure would cause a downward motion of the pivot points 138 and 140. Mounted on the secondary plate 130 is the horizontal arm 142 extending over to a pivotal connetcion 144 with the lower end of the probe rod 72. Thus, composites of lateral and vertical motion at the probe ball 124 will have a proportionate response in probe rod 72 which is carried through the linkage shown in FIGURE 2 to the pivot 104 and the cross-over ram 106 and in-put rod 110. The links 126–128, 134–136 are disposed such that a movement on the 19° line, above referred to, cause a cancellation of the upward and downward motion on pivots 138 and 140. Deviation from this line creates a response in plate 130 and arm 142 to probe rod 72.

A retraction cylinder 146 and piston 148 is connected through a slotted link 149 on a piston rod to permit pneumatic retraction of the probe for a return motion of the entire slide in the end of a welding journey. It will be appreciated that other probe devices of various construction may be used including photoelectric or hydraulic units.

It will be appreciated also that the signal which is introduced into the memory device through the arm 110 and the cams 250 is only the algebraic sum of the plus or minus reading of the probe relative to the master cam motion. Pivot points 88 and 90 ride with master cam 22 through brackets 52 and 68. Thus the roller 100 reads only the error of the workline from the master cam 22.

The Response Mechanism for work unit carrier consists of a vertical rod 150 extending from the memory device shown in FIGURE 6 having on the lower end a mounting for a bracket 152 extending downwardly in a mounting plate 154 for a torch mount shown diagrammatically in FIGURE 9.

The Memory Device which associates the probe mechanism with the work unit carrier, that is, the output of the system, is shown in section in FIGURE 6. It consists of a cylindrical housing 180 suitably mounted on plate 56 by bolts 181. The housing has within it a rotary drum 182 mounted on a shaft 184 journaled in the bottom 186 of the housing at 188 and journaled in the top 190 of the housing in a roller bearing 192 and a bearing 193. The drum and shaft are driven through a pulley 194. The pulley drives the shaft 184 through a disc 196 connected to the pulley by a shear pin 198 and a form sprag clutch 200. The drum 182 has a plurality of vertical plungers 202 closely spaced circumferentially around the drum, said plungers having enlarged heads 204 which permits the heads to be closely spaced together to form a substantially continuous surface. The plungers can be locked in place by balls 206 held down by leaf springs 208 spaced around the drum, the balls acting in slots having an angled wall 210, so that the balls wedge in to lock the plungers 202 against downward motion. These balls can be released by release pins 212 mounted at an angle around the drum radially outside the plungers 202.

The belt operating the pulley 194 is shown in FIGURE 4 at 220 passing from the driving pulley 42 on shaft 28 around a corner pulley 222 and idler pulley 224, the latter pulley being adjustable to control the tension on the belt. Since the shaft 28 is directly related in its motion to the lateral motion of the entire head along the machine as a result of the engagement of the gears 30 with the racks 32, the motion of the drum 182 will be proportional directly to this motion of the head.

The relationship of the vertical input and output to the drum is maintained by the setting of the plungers 202. The input setting is controlled by arm 102 through the rod 110, previously described, which passes down into the drum housing 180, the rod being disposed for axial motion in the housing. On the rod are spaced brackets 226 and 228 fixed to the rod by pins 230. The bracket 226 is stabilized against rotation by a pin 232 anchored in the bottom 186 of the housing. On the brackets 226 and 228 are upper and lower cams 240 and 250 spaced the distance between the opposite ends of the combined plunger and head 202–204. Adjacent the cams 240 and 250 is a circular release cam 254 bolted to the bottom 186 of the drum housing. This release cam is radially spaced outwardly from cams 240 and 250 to contact the bottom end of the pins 212. At the point of setting, it will be seen in FIGURE 6, that the pins 212 are elevated by the cam 254 so that the pins are moved upwardly against the springs 208 to release the balls from their locking position on the plungers.

After the plungers 202 are set by the spaced cams 240–250, the pins 212 are dropped from a high point 256 on locking cam 254 to a low point 258 on this cam, and the plungers 202 will therefore be locked by the balls 206 in the vertical position to which they have been moved. The plungers then rotate around with the drum which is maintained in its vertical position on shaft 184 by thrust bearings and sleeves 260 and 262.

The input is thus recorded by the position of the plungers 202 and remembered or retained by the arrangement of the locked plungers until they reach the output side of the drum on the left-hand side of FIGURE 6. The output is read by a ball bearing roller 270 rotatably mounted on bracket 272 which is stabilized against rotation by pin 274. Bracket 272 is mounted on the output shaft 150 by a pin 276. The roller 270 actually bears on the tops of the plungers 202 and the weight of the output rod 150 together with the welding rod bracket 152, 154 is carried by the roller 270 and the plungers 202.

As shown in FIGURE 6, the lock pins 212 are in their release position on the low side of cam 254. After the reading is taken on the plungers by the rollers 270, the plungers pass around to a raising portion 278 on cam 254 (see FIGURE 9) so that the pins 212 are again raised to move up the balls 206 to a release position.

Once the plungers are released, they are reset to a neutral position by a reset cam 280 (FIGURE 7) shown diametrically in FIGURE 9 after which they pass again to the input cams 240–250.

The setting of the cams from the neutral position is determined by the position of the probe relative to the supporting cam follower 36.

The linkage mechanism associated with probe rod 72 is actually a differential mechanism. It is traveling on the master cam 22 so that if the probe moves down on the work, this drop will not be reflected in the motion of arm 102 as long as the follower 50 is moving down also. On the other hand if the follower 50 moves down on cam 22 and the probe 124 does not move down accordingly due to an irregularity in the work, this discrepancy will be reflected in motion of the transfer plate 92 and arm 102. From this it will be seen that if the master work line is perfectly reproduced in the work the arm 102 would transmit no signal to the plungers.

In FIGURE 9, certain of the parts are shown in diametrical layout. The mechanism as a whole, the entire head, is supported on the master cam 22 by the roller 36 as shown in FIGURE 1. The master cam 22 has the designed curve of the part, that is, the theoretical contour. The work line as shown in FIGURE 9 is the actual contour of the work which may vary all the way up to ¼ inch to ⅜ of an inch from the design contour.

The probe 124 follows the actual contour of the work and reflects the difference between the actual work line and the theoretical master cam line. This difference is transferred through the cams 240–250 to the plunger 202, which are proportionately displaced, and the welding torch 300 following along behind the probe will also be raised or lowered by the supporting rod 154 riding on the roller 270 within the drum as it reaches the point which was previously read by the probe so that it is in the proper position for the welding action.

As previously described, the structure in FIGURE 8 is responsive not only to vertical variations in the actual work line of the part, but also reflects horizontal variations so that the torch will be raised or lowered properly if the work line should vary laterally as well as vertically.

What is claimed is as follows:

1. In a tool moving device of the type having a basic frame member, a carriage for a work head slidably disposed on said frame member, a probe movably supported on said carriage for moving over a work line as said carriage moves along said frame, and a work head supported on said carriage, an improvement in means for positioning said workhead in response to motion of said probe relative to said carriage comprising a master cam having the shape of the planned contour of the work line secured to said frame, means to support the carriage for progressive movement along said planned contour, a rotating drum carried by said carriage, means on said drum circumferentially spaced thereon and axially shiftable relative thereto comprising a plurality of plungers, means for locking said plungers at certain portions of travel as said drum rotates, means responsive to motion of said probe relative to said carriage reflecting disparity between said master cam and said work line for setting said plungers axially relative to said drum, and means adjacent the drum supporting said workhead responsive to the positioning of said plungers to move the workhead in a path related to that followed by the probe a predetermined distance behind said probe.

2. A tool moving device as defined in claim 1 in which means is provided for rotating said drum in response to motion of said carriage on said frame.

3. A tool moving device as defined in claim 1 in which means is provided for rotating said drum in response to motion of said carriage on said frame comprising a rotatable input shaft on said carriage, a drive shaft for said drum, rack means on said frame, gear means on said input shaft engaged with said rack means, whereby movement of said carriage cause rotation of said input shaft, and drive means connecting said shafts for mutual rotation.

4. A tool moving device as defined in claim 1 in which the means responsive to motion of the probe comprises a cam positioned adjacent said drum in a position to contact said plungers to shift said plungers, and means connecting said cam and said probe to shift said cam continuously as said carriage moves to reflect the disparity between a work line and the path of said carriage and to set said plungers accordingly.

5. A tool moving device as defined in claim 4 in which the last named connecting means comprises linkage to translate vertical motion of said probe to a horizontal motion, and a lever arm to retranslate said horizontal motion to vertical motion of said cam.

6. A device as defined in claim 1 in which the means for locking said plungers comprises a locking recess adjacent each plunger having a canted wall, a ball in said recess in contact with a plunger and said wall, and a retaining spring urging said ball into said recess.

7. A device as defined in claim 6 in which unlocking means is provided for said plungers comprising unlocking pins positioned adjacent each recess shiftable to move said balls against said spring, and an unlocking cam positioned adjacent said drum to contact said pins in the course of their revolvement with said drum.

8. A device as defined in claim 7 in which a reset cam is positioned in the path of said plungers to move them to a neutral position after unlocking and before reset.

9. A device as defined in claim 1 in which the means supporting said work head comprises a slidable shaft on said carriage adjacent said drum, a means on said slidable shaft resting on the said plungers as they revolve with said drum whereby said shaft moves in the path determined by the setting of said plungers.

10. A device as defined in claim 9 in which each plunger has a head enlarged from the plunger positioned closely adjacent similar heads on adjacent plungers to provide a substantially continuous surface for said roller to traverse.

11. A device as defined in claim 1 in which the means supporting said work head comprises a slidable shaft on said carriage adjacent said drum, said plungers being slidably positioned in closely adjacent holes around the periphery of said drum, and a roller connected to said slidable shaft resting on the ends of said plungers to reflect the axial position of said plungers to said slidable shaft.

12. In a following device for controlling a work head in the following of a work line of a workpiece, a probe, a contact end on said probe, carriage means translatable along the work line for movably mounting said probe whereby the contact end of said probe may follow said work line, a work head movably mounted on said carriage means, a mechanical recording and reading device movable with said carriage means which comprises a rotating part, a plurality of radially disposed, closely-spaced, movable elements axially shiftable on said part, means to lock each of said elements in one of an infinite number of positions of axial adjustment, input means adjacent said part to shift said elements sequentially in response to a signal input at said probe, reading means on said carriage means adjacent said part to contact said elements shiftable in response to the positions of said elements as they move with said rotating part, and differential means movable with said carriage connecting said probe and said input means to shift said input means in response to variations in said work piece.

13. A device as defined in claim 12 in which the probe includes a mounting plate for association with said carriage, a secondary plate swingable on parallel links operatively connected to said mounting plate, and a primary plate mounted on parallel links to said secondary plate, said primary plate carrying said contact end of said probe to contact a work piece.

References Cited in the file of this patent

UNITED STATES PATENTS

| | | |
|---|---|---|
| 1,996,131 | Vreeland | Apr. 2, 1935 |
| 2,089,015 | Bucknam et al. | Aug. 3, 1937 |
| 2,326,247 | Nicholides | Aug. 10, 1943 |
| 2,484,331 | Bels | Oct. 11, 1949 |
| 2,686,415 | Griffin | Aug. 17, 1954 |
| 2,721,989 | Gates et al | Oct. 25, 1955 |
| 2,746,093 | Raper | May 22, 1956 |
| 2,770,975 | Galley | Nov. 20, 1956 |
| 2,808,506 | Skwarek | Oct. 1, 1957 |
| 2,811,085 | Burke | Oct. 29, 1957 |
| 2,827,547 | Tiedemann | Mar. 18, 1958 |
| 2,927,992 | Bateman | Mar. 8, 1960 |
| 2,978,753 | Mackie | Apr. 11, 1961 |
| 3,026,743 | Curtis | Mar. 27, 1962 |

FOREIGN PATENTS

| | | |
|---|---|---|
| 808,190 | Great Britain | Jan. 28, 1959 |